Patented Sept. 10, 1929.

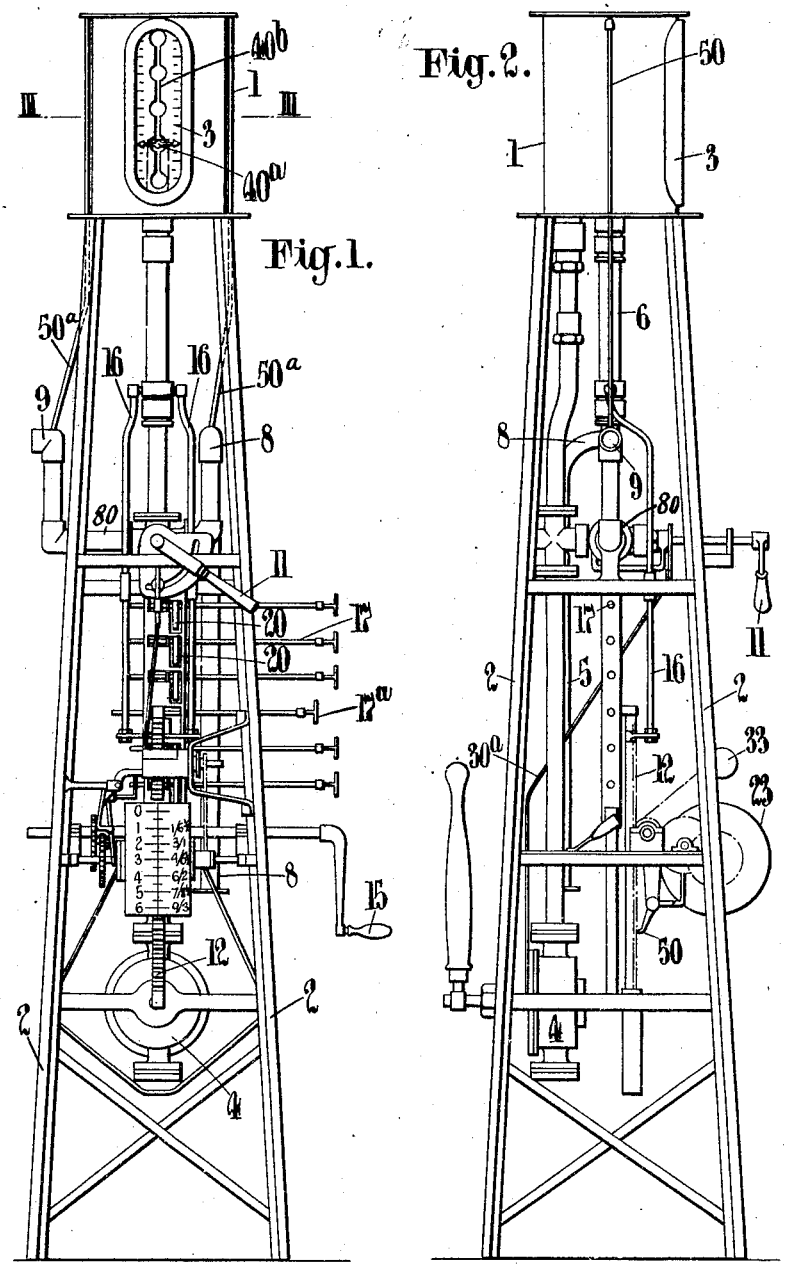

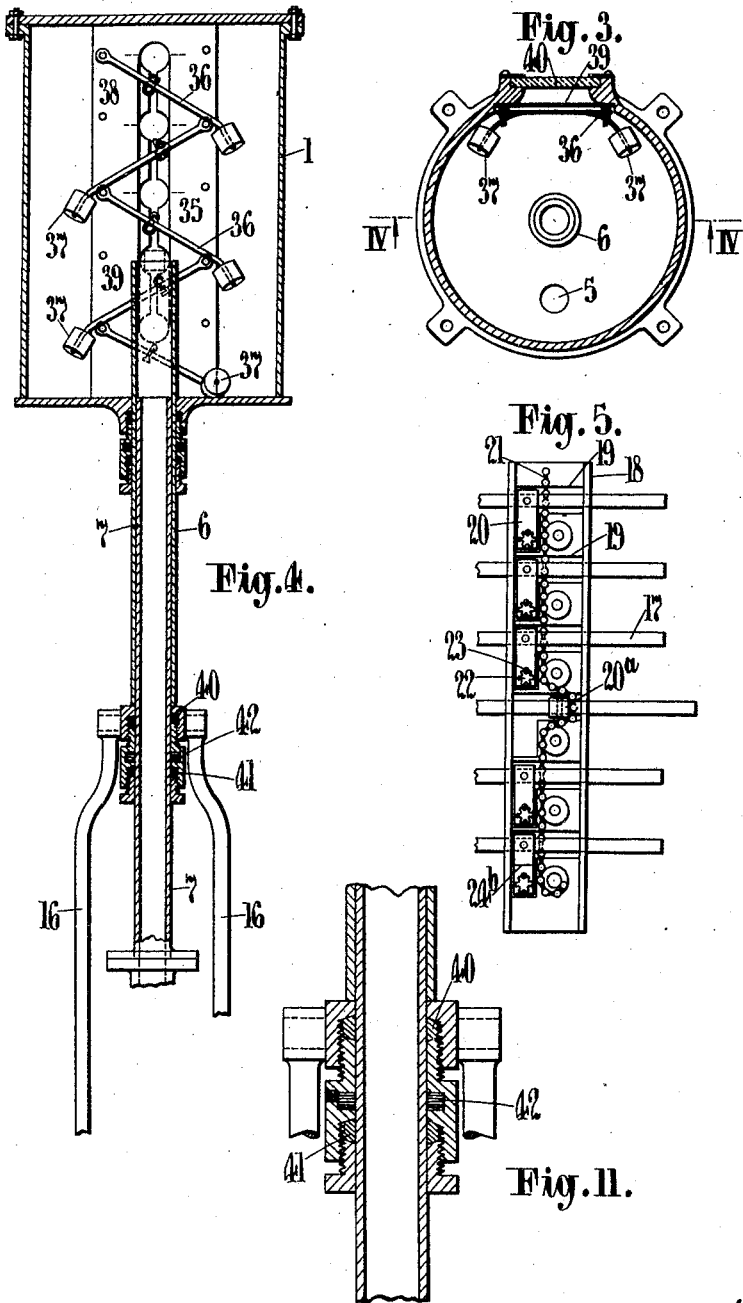

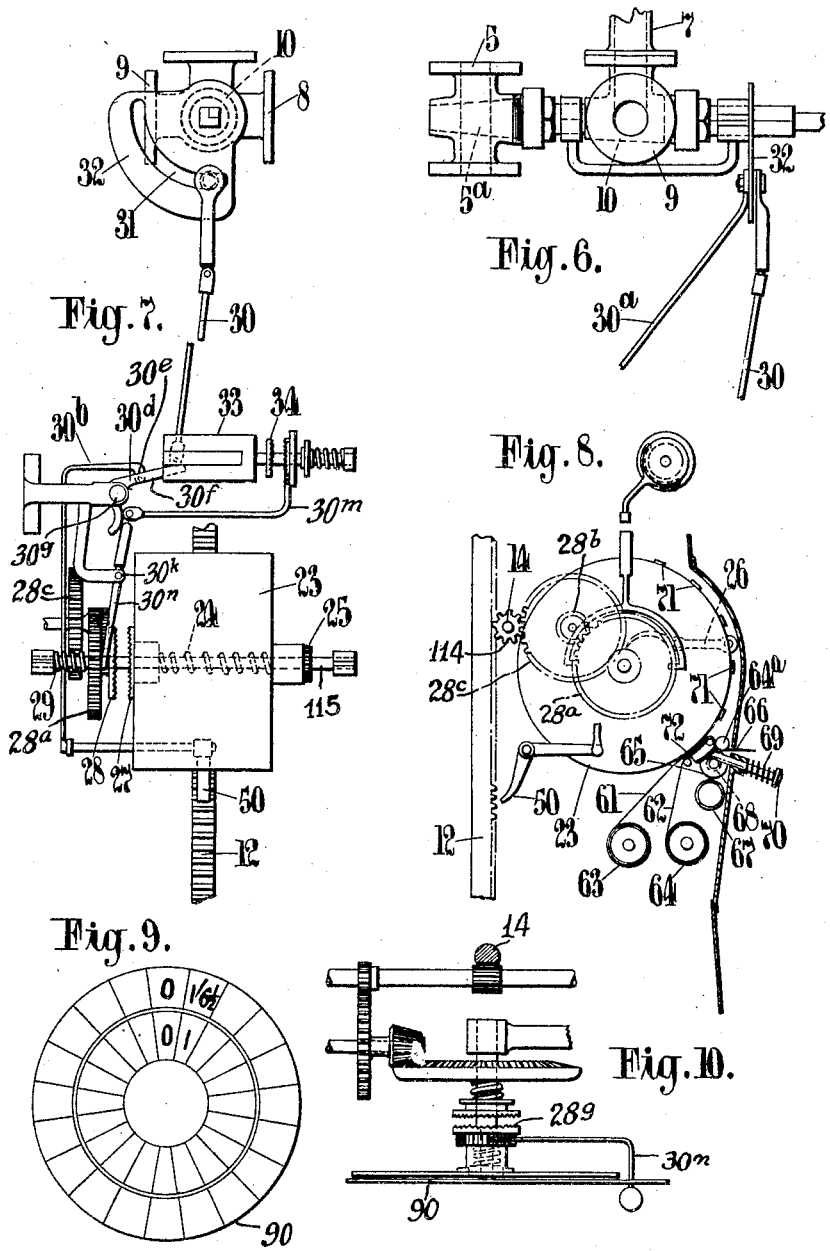

1,727,743

UNITED STATES PATENT OFFICE.

FRANK PILMORE-BEDFORD AND DANIEL JOSEPH PILMORE-BEDFORD, OF CATFORD, LONDON, ENGLAND.

LIQUID DELIVERY DEVICE.

Application filed April 27, 1926, Serial No. 104,990, and in Great Britain October 19, 1925.

This invention relates to devices for delivering measured quantities of liquids by volume, e. g. petrol delivery pumps, of the kind in which the liquid prior to delivery is passed through an inspection container or visible measure so that the purchaser can see for himself the amount of liquid delivered, an indicator and/or recorder being provided which is only actuated as the liquid passes from the inspection container to the final delivery point.

In the preferred form, the container comprises a vessel having a horizontal bottom provided with two holes of which one is connected to the source of supply and the other is fitted with a tube adapted to be slidden vertically up through the orifice so that its upper end determines the height to which the container can be filled with liquid. The lower end of the sliding tube is connected to a bifurcation controlled by a cock whereby liquid overflowing down the tube during the act of supplying liquid to the container is returned to the supply tank. After the requisite amount of liquid has been pumped into the container, however, the cock is turned and the tube lowered whereupon the liquid in the container is delivered down the tube to the delivery nozzle. During this movement the tube is operatively connected to the indicating and/or recording devices so that the act of lowering the tube moves the necessary indicators, and the extent to which the tube is lowered, which determines the amount of liquid delivered from the container, also determines the amount by which the indicator is moved.

The invention is illustrated in the accompanying drawings in which:—

Figs. 1 and 2 illustrate front and side views of a petrol pump in accordance with this invention, Fig. 3 is a sectional plan on the line III—III of Fig. 1, Fig. 4 is a sectional elevation on the line IV—IV of Fig. 3.

Fig. 5 is a detail viewed from behind the selective setting devices.

Fig. 6 is a detail of the cocks controlling the feed pipe and combined overflow and delivery pipe.

Fig. 7 illustrates a counter and an indicating device viewed from the front and adapted to be operatively connected to the slidably tube by means actuated by the cock shown in Fig. 6.

Fig. 8 is an end view of part of Fig. 7, showing also details of a printing device.

Figs. 9 and 10 illustrate front and plan views of a modification of Figs. 7 and 8.

Fig. 11 is a sectionl view of a gland to the slidable tube.

Referring now to the drawings, the device comprises a chamber 1 supported on legs 2 at a height of about 8 or 10 feet and fitted with one or more windows 3 thus serving as a visible measure or inspection container into which liquid is pumped in measured quantity from the pump 4 through the pipe 5 fitted eccentrically in the flat bottom of the container. A second pipe 6 has access centrally to the bottom of the container and can be raised and lowered through the bottom so that the height of its upper end determines the height to which the container is filled from the pump 4. The pipe 6 slides over an inner tube 7 connected at its lower end to a bifurcation, Figs. 6 and 7, giving access on the one hand to the overflow pipe 8 connected to the supply tank below the pump 4, and on the other hand to the delivery pipe 9 adapted to deliver the liquid to the automobile, the bifurcation being controlled by a cock 10 having an L-shaped passage illustrated more particularly in Fig. 7 and controlled by a handle 11, Fig. 1.

The tube 6 is adapted to be raised and lowered through the intermediary of arms 16 by means of a rack 12 engaged by a pinion 114 Fig. 8 on a horizontal shaft 14 rotated by a handle 15, and the amount of the lift is adapted to be controlled by a plurality of selective setting devices 17, Fig. 1, of which a rearward enlarged view is illustrated in Fig. 5. These comprise a plurality of horizontal rods 17 slidable through the cheeks of a U-shaped vertical plate 18 having L-shaped slots 19 in its central face.

The rods 17 carry projecting arms 20 adapted normally to lie in the vertical limb of the L-shaped slots 19. If one of the rods 17 is rotated through 90 degrees and pushed in towards the left in Fig. 1 (that is, towards the right in Fig. 5), the arm 20 will be raised horizontally and will be held in the horizontal limb of the L-shaped slot 19 so as to project horizontally from the central face of the plate 18 as shown specifically at 20$^a$, Fig. 5, in which position the arm projects into the path of the rack 12 and limits its upward movement. A chain 21 is deflected by the arm 20$^a$ during its lateral movement as shown in Fig. 5, the chain being of such a length that on subsequent similar operation of a different push-rod 17, the rod which has already been actuated will be restored to its initial position, whereupon the arm 20$^a$ will fall down under gravity to re-occupy the vertical limb of its L-shaped slot 19. The exact setting of the lift of the rack 12 is determined by a micrometer device comprising a screwed pin on the projecting arm 20 having a star-shaped head 22 Fig. 5 adapted to be maintained in its adjusted position by a grub screw 23.

The indicating device comprises a drum 23 on which is preferably marked quantities by volume and total costs of the said quantities in horizontal line therewith. The drum 23 rotates freely on a shaft 115 parallel with shaft 14 and is provided with a return spring 24 Fig. 7 and carries with it a ratchet 25 adapted to be engaged by a pawl 26 Fig. 8 to prevent reverse motion under the spring 24. It also carries one element 27 of a dog clutch of which the other element 28 is carried by a wheel 28$^a$ engaging through a train of wheels 28$^b$, 28$^c$ with wheel 114 on the shaft 14 as will be apparent from Fig. 8, the clutch being normally urged into the engaged position by a spring 29, but held out of engagement by links 30, 30$^d$ pivoted at 30$^e$, 30$^f$ pivoted at 30$^g$ and 30$^h$ pivoted at 30$^k$. The link 30 is controlled by a cam-shaped slot 31 in a plate 32 fixed to the handle 11, the arrangement being such that the clutch is disconnected when the cock 10 is in position connecting the tube 6 to the overflow pipe 8, but on the other hand is engaged when the cock 10 connects the tube 6 to the delivery pipe 9, this being effected through the eccentricity of the slot raising and lowering the upper link 30.

A recording counter 33 of any known construction may be similarly operated from a clutch 34 controlled through the link mechanism 30$^d$ through the pusher 30$^m$.

The container 1 is provided with a series of indicators which in the form shown comprise numbers 35, Fig. 4, carried by pivoted rods 36 whose free ends are fitted with floats 37. As the liquid rises within the container 1, the floats 37 are raised so that the numbers 35 are brought into view through openings 38 in a metal plate 39 behind the glass front 40 of the window 3.

The level of the liquid in the container 1 may also be plainly indicated by a float having an indicator 40$^a$ Fig. 1 slidable in a vertical slot 40$^b$ in the plate 39. The pump 4 is preferably held locked when the handle 11 is in the delivery position by means of a second linkage 30$^a$ Fig. 6 operated from the cam slot 31 and rigidly secured to link 30.

It should be explained that the six push rods illustrated in Fig. 5 correspond to the delivery of ½ gallon, or 1, 2, 3, 4 or 5 gallons, the lowest arm 20 being cranked and offset as indicated at 24$^b$ Fig. 5 so that its abutment pin is situated when raised a distance corresponding to ½ a gallon above the top of the rack in its lowest position and a similar distance below the corresponding pin of the arm 20 next above it.

The operation of the device as above described is as follows:—

In order to deliver for example 2 gallons of petrol, the push rod indicated at 17$^a$ in Fig. 1 is rotated and pushed to the left as shown; the rack 12 is then raised by rotating the handle 15 until its upper end comes into contact with the horizontally-extending arm 20$^a$. This will raise the tube 6 to an extent such that its upper end corresponds to the retention of 2 gallons of petrol in the container 1. The petrol is now pumped into the container from the pump 4 through the pipe 5, any surplus beyond 2 gallons overflowing through the pipe 6 and returning back to the supply tank through the pipe 8. The rack can only be raised when the cock 10 is in the position giving access to the overflow pipe 8 since in the alternative position of the cock the pinion operating the rack is clutched to the drum 23, reverse movement of which is prevented by the pawl 26. As a further safeguard, we provide a pawl 50 which permits the rack to be lowered but prevents it from being raised unless the cock is in the overflow position, the pawl being brought into and out of position for engagement with the rack by the links 30, 30$^b$. This pawl is made of solid construction specifically for this purpose as it is not desired to rely therefor on the weaker construction of the pawl 26 and ratchet 25.

During the raising of the rack, the drum 23 and the recording device 33 are free of the shaft 14 and do not move. As the petrol rises in the chamber 1, the purchaser will see the indicating number 35 come into view before the corresponding window 38 and can thus verify the amount of petrol received in the container. The cock 10 is then turned to put the pipe 6 into communication with the delivery pipe 9, thus clutching the indicator 23 and recorder 33 to the shaft 14 through clutch members 27, 28, and the handle 15 is rotated in the reverse direction lowering the rack. As the tube 6 falls within the container 1, the liquid contained therein passes down the tube under gravity through the pipe 9 to the delivery point and the indicating and recording devices are operated to an extent strictly corresponding with the amount of liquid passing through the pipe 9. Thus for example if 2 gallons are ordered but it is found that only 1 gallon can be delivered, the operation of the rack is arrested and the indicator and recorder only register 1 gallon, the remaining gallon being returned to supply through the pipe 8 after rotation of the cock 10, in which circumstances the indicating and recording devices are not affected by the further downward movement of the rack. Obviously a pressure feed instead of a gravity feed may be adopted if desired.

After the delivery and sale have been completed and the cock 10 turned to the overflow position thus freeing the drum 23 from the shaft 14, the pawl 26 is lifted by hand and the drum returns to zero position under the spring 24. The drum 23 may be marked in gallons and fractions of gallons, and also show the costs of each quantity and it will be appreciated that by this device we provide an exact means whereby the purchaser of any required quantity of liquid can actually see the amount purchased in the visible measure or inspecting chamber 1, and also whereby the indicating and recording devices are only operated as the liquid passes from the container 1 to the delivery point.

It will be appreciated that if the rack is moved down when the cock 10 has been turned to the overflow position, both the recorder 33 and indicator 23 are released from the shaft 14. Thus these devices are prevented from giving a false record when liquid in the container 1 is merely being returned to supply.

In addition to the recorder 33 which gives a cumulative record of quantities delivered through the pipe 9, we also provide a record of sales and means to supply the purchaser with a record or receipt on each transaction. This feature preferably comprises a pair of paper strips 61, 62, Fig. 8, supplied from rollers 63, 64 in the vicinity of the indicator drum 23. The strips are held between feed rollers 64ª, 65 one thereafter passing through an opening 66 in the wall of the device and the other being rolled on roller 67. The roller 65 is provided with a sprocket 68 engaging the roller when moved in a clockwise direction in Fig. 8 but running free in a counter-clockwise direction the sprocket being engaged by a spring-controlled sliding rack 69 having a push knob 70. The drum 23 is provided with cutters 71 in the form of pins or tubes at points corresponding to the quantities marked on the drum and operation of the push knob drives the inner end of the rack which is provided with a suitable abutment block 72 against the cutters so as to imprint a record of the sale on both strips. Return movement of the rack under its control spring feeds forward the strips, one being coiled on the roller 67 and the other which is preferably perforated for ready detachment fed through the opening 66.

An important detail of the apparatus consists in the means whereby a petrol-tight joint is maintained between the tube 6, 7. This comprises a pair of glands 40, 41 of known type together with a special gland filled with castor oil, glycerine or other petrol resisting fluid 42 shown separately in Fig. 11. In the form shown, the body of the lower gland 41 is provided with an internally facing annular recess 42 adapted to be filled with castor oil through the intermediary of a small passage closed by a grub screw adapted to hold the oil under slight pressure. We find that by this means an efficient device is provided adapted to work satisfactorily in fulfillment of its function.

Figs. 9 and 10 illustrate a modification of the indicator device 23 in which the indications are marked on a flat disc 90 instead of a drum, the disc 90 being clutched and unclutched to the shaft 14 by means illustrated which are in every way comparable to those illustrated in Figs. 7 and 8 and include movable clutch member 28ᵍ and pusher 30ⁿ corresponding to pusher 30ᵐ of Fig. 7.

In the preferred form the supply pipe 5 is also controlled by a cock 5ª and as will be seen from Fig. 6 this cock and the cock controlling the bifurcation of the sliding tube are mounted on a common spindle and work together so that the supply pipe 5 is shut off when the sliding tube is open to the delivery pipe 9.

It will be appreciated that the supply pipe line from the container 1 includes a U-shaped element 80, Figs. 1 and 2, in which after the first supply a quantity of liquid will remain. This, however, will not introduce any error into the subsequent use of the apparatus and affords the advantage of enabling the flexible tube attached to the end of the delivery pipe 9 to be suspended from a higher level to accommodate various types of automobile. The top of the tube 9 and overflow pipe 8 are provided with vent pipes 50ª to prevent siphoning.

We claim:—

1. In a device for delivering measured quantities of liquid by volume, a visible inspection chamber, a combined overflow and delivery pipe slidable through the bottom of said chamber, movable control means to connect said pipe either to the delivery point or back to the supply point, a pump to supply petrol to said chamber, an indicator to indicate the amount said combined overflow and delivery pipe is lowered, means connecting said control means to said pump and to said indicator whereby said pump is locked and said indicator is clutched to said pipe when said pipe is connected to the delivery point both being freed when said pipe is connected to said supply point.

2. In a device for delivering measured quantities of liquid by volume, in combination a visible inspection chamber having a window, a combined overflow and delivery tube slidable through the bottom thereof, means to indicate the amount of liquid retained in said chamber at the height appearing through the window, said means reading upwardly from the bottom of said chamber, and a series of downwardly directed alternative stops adapted to arrest the lift of the combined overflow and delivery tube at points corresponding to the readings of said indicator without interfering with the free downward movement of the tube, said stops comprising gravity controlled arms suspended in vertical line, any one of which can be projected horizontally to arrest the lift of said combined overflow and delivery pipe, and means to hold said arms in the horizontal position, whereby the projection horizontally of any of said arms automatically releases any other of said arms from the horizontally holding means.

In testimony whereof we affix our signatures.

FRANK PILMORE-BEDFORD.
DANIEL JOSEPH PILMORE-BEDFORD.